July 3, 1962 A. BUCHI 3,042,012
TWO-STROKE INTERNAL COMBUSTION ENGINES
Filed Aug. 4, 1958 3 Sheets-Sheet 1

Alfred BUCHI
INVENTOR
By:
Wenderoth, Lind&Ponack
Attys

Alfred BUCHI
INVENTOR

By: Wenderoth, Lind & Ponack
Attys

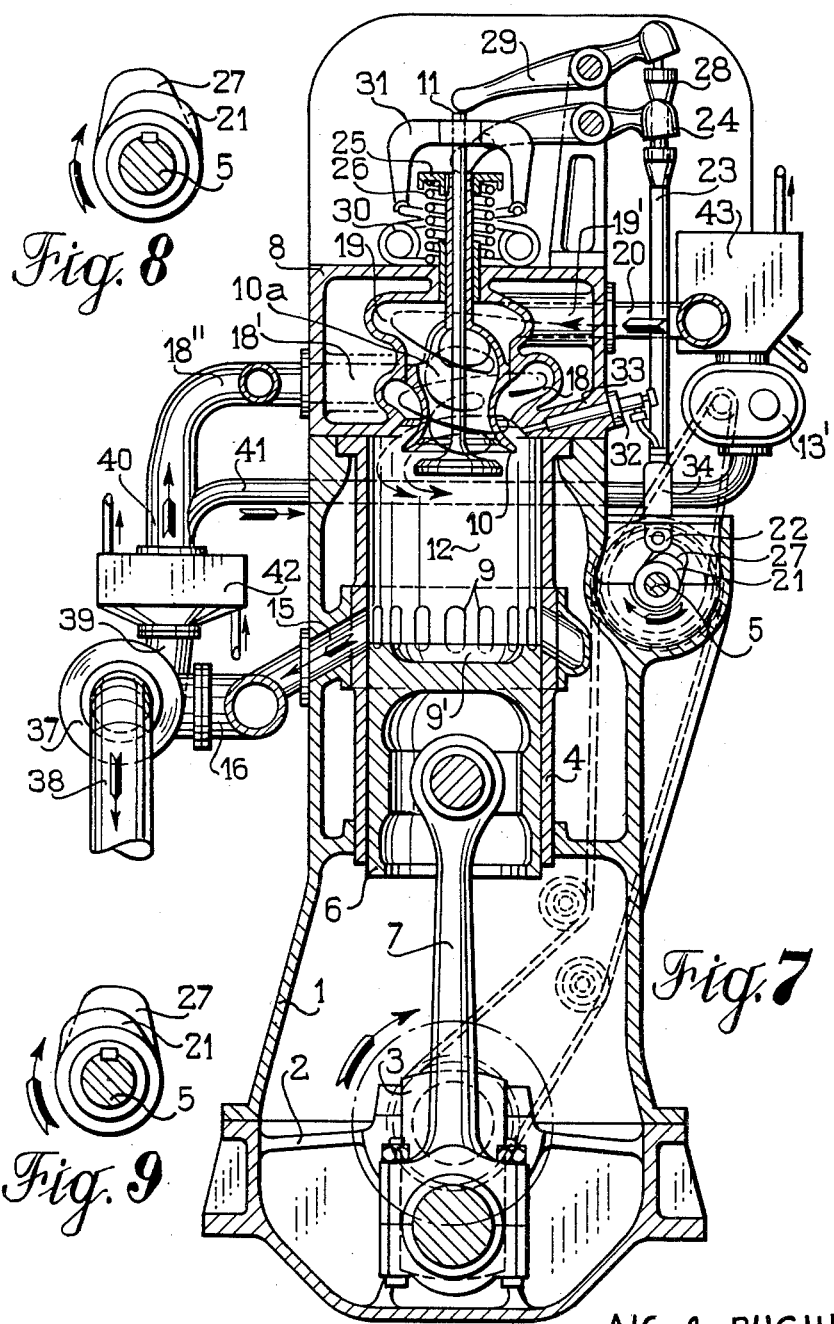

United States Patent Office 3,042,012
Patented July 3, 1962

3,042,012
TWO-STROKE INTERNAL COMBUSTION ENGINES
Alfred Buchi, Hurden, Schwyz, Switzerland; Hermann Walder, executor of the will of said Alfred Buchi, deceased, assignor to Ingenieurbureau Dr.-Ing. Alfred J. Buchi A.G., Winterthur, Switzerland, a Swiss company
Filed Aug. 4, 1958, Ser. No. 752,926
Claims priority, application Switzerland Sept. 17, 1957
6 Claims. (Cl. 123—65)

The invention relates to two-stroke internal combustion engines comprising scavenging and supercharging air valves in the cylinder head and exhaust ports near the bottom dead centre position of the piston.

According to this invention the engine is characterised in that the scavenging and supercharging air enters the cylinder through at least two inlet valves disposed concentrically and movably one inside another in the cylinder head. This step provides a large total entry area for the scavenging and supercharging air on a very small diameter of the cylinder head surface. The valve weights are also reduced, a very important feature in the light of their short and abrupt opening and closing in two-stroke internal combustion engines.

The combustion chamber may comprise a recess in the piston crown, such recess being of smaller external diameter than the piston diameter.

It is a feature of the invention that one of the two concentric valves, for instance, the outer valve, is opened first in order that the cylinder may first be scavenged and cooled along its periphery and in order that the actuating forces associated with the consecutive opening of the two valves may be reduced or separated. This is very important because in the outer cylinder part there is or should be mostly pressure medium, gases and scavenging or supercharging air.

The two concentric inlet valves may be provided centrally in the cylinder head. This simplifies cylinder head design and actuation of the inlet valves considerably and also ensures satisfactory exhausting scavenging and charging of the cylinder symmetrically around the cylinder axis. The inner of the two inlet valves may be opened first at the beginning of the scavenging phase and the outer inlet valve may be opened subsequently, in order to reduce or separate the actuating forces associated with the opening of the valves and to provide a locally staggered scavenging action in the cylinder.

According to another feature at least two concentric inlet valves are closed seriatim to prevent the valves from closing simultaneously on their seatings and to separate the associated actuating forces in time whereby the forces on the valve-actuating gear is not an aggregation of the separate forces for the several valves. The inner valve may close on the outer valve only when the outer valve has already closed on the cylinder head. This step prevents extra forces from being transmitted to the valve-actuating gear for the outer valve. If the scavenging and charging air in the cylinder head is introduced tangentially through at least one of the inlet valves, rotation of such air can be initiated by such valve at the entry into the cylinder. If the entering scavenging and charging air is thus rotated, there can be increased cooling, at least in a part of the cylinder, for instance, the wall bounding the cylinder chamber. For instance, the scavenging and charging air can flow in the axial direction to the cylinder axis in the centre of the cylinder or can rotate around such axis. Such rotation, which continues during the compression and combustion strokes, and are further increased in the restricted combustion chamber, improve fuel distribution and combustion in the cylinder. Also, if the scavenging and charging air in the cylinder head is introduced tangentially, such air can be rotated by at least one of the two inlet valves in the same or opposite direction as it enters the cylinder. This step improves cooling and fuel distribution still further.

It is also a feature of the invention that the rotation associated with entry through one inlet valve into the cylinder initiates a higher rate of eddying than through the other inlet valve. Rotation in opposite direction can be initiated by the two valves. This produces a fuel distribution and atomisation better adapted to the position in the combustion chamber with a resultant improvement in combustion. The rotation associated with the inner inlet valve can be greater or less than the rotation associated with the outer inlet valve. The entry conduit through which scavenging and charging air is conveyed to at least one of the inlet valves can be eccentric to the associated valve axis, in such manner that rotation is initiated or increased at least in the space between the valves or outside one of the valves and in the cylinder chamber. A helical transition casing may be provided in the region where the entry conduit merges with the entry region of at least one of the inlet valves, thus initiating or increasing rotation in the space between or outside the valves and in the cylinder. A separate entry conduit may be provided in each cylinder head to the entry of each of the two inlet valves. Alternatively, however, only one common entry conduit is provided in the cylinder head for the two entries of the two inlet valves. Where cylinders are arranged in adjacent pairs in one cylinder head, only one entry conduit each may be provided in the cylinder head to the space before each inlet valve so that opposite rotation is initiated, for instance, in the space before the two inlet valves and in the two adjacent cylinders. The entry conduits may extend separately to the inlet valves of the adjacent cylinder.

The design of the exhaust ports in the cylinder may be such that not only is the scavenging and charging air in the cylinder head introduced tangentially, to effect rotation of such air as it enters the cylinder, but also there is a tangential exit through the exhaust ports in the cylinder, such exit initiating or increasing in the cylinder a rotation preferably in the same direction as the rotation associated with the inlet valves. The collector for the exhaust gases which have passed through the exhaust ports may be spiral in such manner that the rotation of the exhaust gases and scavenging air upon exit from the cylinder is continued or increased in the same direction as the rotation associated with the inlet valves in the cylinder head.

A fuel injection device may be provided which is so disposed that fuel is injected tangentially into the cylinder combustion chamber between the piston and the cylinder head. This step obviates the necessity of providing a fuel injection device in the centre of the cylinder head in conventional manner and the rotation in the cylinder simplifies and improves fuel distribution and atomisation. Another advantage is that fewer injection nozzles with relatively large apertures and relatively low injection pressures are required. The fuel injection can also be so arranged that the fuel is mainly directed into the recessed part in the piston crown thereby to prevent a large amount of fuel from impinging directly on the cooled cylinders or cylinder head surfaces, a feature resulting in certain disadvantages and heat losses.

The apparatus for scavenging and supercharging may be of such a size and design that the space downstream of the exhaust ports (e.g. around the cylinder liner) is at least partly scavenged with relatively cool scavenging air and remains filled with such air during the compression, combustion and expansion phase. One inlet valve may be supplied with scavenging air and the other with charging air, preferably at the termination of scavenging. Pressure media, which may or may not be at different pressures, can be supplied to the two inlet valves from various superchargers or supercharger stages. Charging air may be supplied mainly to the internal combustion engine through one inlet valve and scavenging air through the other. For instance, charging air can be supplied through one inlet valve by a supercharger driven by the engine or by other means, while scavenging air is supplied to the engine by a turbo-supercharger through the other inlet valve. One supercharger can derive its pressure medium from the delivery conduit of the other supercharger.

The two inlet connections of the two inlet valves for the pressure medium can be arranged on the same side or on opposite sides of the cylinder head. Through at least one of the inlet valves (and preferably through both valves) scavenging and charging air can be supplied to the engine by at least one blower driven by the engine or by other means or by a turbo-supercharger.

The arrangement may be such that at least one exhaust gas turbine, its supply conduit or conduits and entry nozzles are so designed that the turbine operates pulse-wise, that is, with a varying entry pressure. It may be also arranged that at least one exhaust gas turbine, its entry conduit and entry nozzles are so designed that the turbine operates at substantially constant entry pressure.

Practical applications of this invention will now be described, by way of example only, with reference to the accompanying drawings whereof:

FIG. 7 is a view similar to FIG. 1 of another construction of engine, and

FIGS. 8 and 9 are cross-sections through the cam-shaft, the control cams being of different designs from those forming part of the engines shown in FIGS. 1 and 7.

Figure 1:
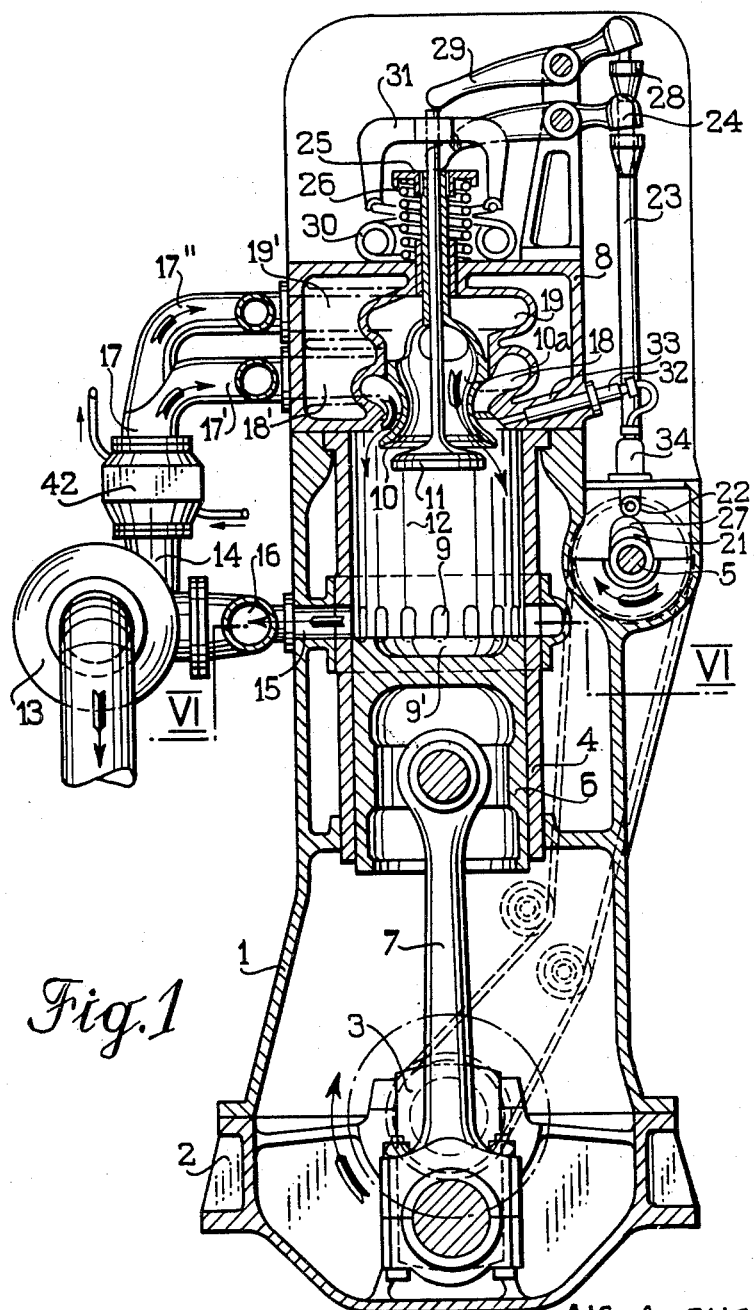
FIG. 1 is a sectional elevation of an internal combustion engine according to this invention.

Referring to FIG. 1, the reference 1 denotes an engine frame, 2 a baseplate, 3 a crankshaft, 4 a cylinder liner, 5 a cam-shaft and 6 a piston of an internal combustion engine according to the invention. 7 denotes a connecting rod and 8 a cylinder head. 9 denotes the exhaust ports for the exhaust gases leaving the machine, and 10 and 11 denote the concentric inlet valves movable one inside another in accordance with the invention. 12 denotes the cylinder chamber, 14 the scavenging and supercharging compressor which, in this case, is driven by an exhaust gas turbine 13. The latter receives exhaust gases from a chamber 15 which surrounds the exhaust ports 9, the gases issuing through the ports 9 entering an exhaust pipe 16 and going thence to the turbine 13. The supercharging blower 14 delivers air through a conduit 17 and branch conduits 17' and 17" separately to the chamber 18', 18 and 19', 19 respectively. From the chamber 19 the charging air passes through the chamber 10a between the two valves to the closure region of the valve 11. The scavenging and charging air then passes through the valve closures of the two valves 10 and 11 into the combustion chamber 12. The inlet valve 10 is opened through the agency of a roller or sliding follower (not shown) co-acting with cam 21 and push-rod 23, rocker arm 24 and valve retainer 25 and the valve is closed by spring 26. The inner valve 11 is controlled by the cam 27 and roller follower 22 through the agency of a push rod 28 and rocker arm 29 and is closed by a double hairpin spring 30 and yoke 31. The cams 21 and 27 can be so designed that the two valves open or close substantially simultaneously. However, one valve can be chosen to open before the other so that the resultant forces applied to the valve-actuating gear (including the cam shaft) can be separated so that the stress applied thereto at a given instant is reduced. For instance, if the outer inlet valve 10 opens before the valve 11, scavenging can be initially effected by way of the valve 10 and subsequently by way of the valve 11, and auxiliary supercharging is possible by way of the valve 11 if the same closes later than the valve 10. A fuel injector 32 is mounted in a connection 33 in the cylinder head 9 so that fuel is directed towards a recess 9' in the piston. A fuel pump 34 is driven from the cam-shaft 5.

In FIG. 1 the cams 21 and 27 are shown as opening and closing the valves 10 and 11 substantially simultaneously. Hence scavenging begins through the two valves substantially simultaneously and the charging through the two valves terminates simultaneously.

As is also shown in FIG. 1, the air delivered by the supercharger 14 can be cooled, for instance, in a heat-exchanger 42 before entering the engine, with the result that cooling of the cylinder heads, cylinders and pistons is increased and engine air intake and engine efficiency are increased and engine economy improved.

Instead of the arrangement shown in FIG. 1, any other kind of supercharger can be used instead of the turbo-supercharger 13, 14 to supply scavenging, supercharging or auxiliary charging air and can be driven mechanically by the engine itself or by other means.

Figure 2:
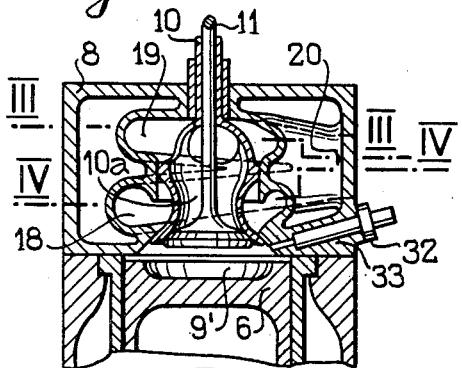
FIG. 2 is a sectional elevation of a cylinder head and through a part of the cylinder showing an alternative construction.

In FIG. 2 the reference 8 denotes a cylinder head, 10 an outer inlet valve, 11 an inner inlet valve, 18 the entry chamber extending to the closure of the valve 10, and 19 the entry chamber extending to the inner inlet valve 11. In this design the chambers 18 and 19 separate at the entry region in the cylinder head 8 and have a common supply conduit 20. The piston 6 is formed with a recess 9'. The reference 32 denotes a fuel injector which is mounted in a connection 33 in the cylinder head and points towards the recess 9'. A number of such fuel injectors may be provided in one cylinder head.

Figure 3:
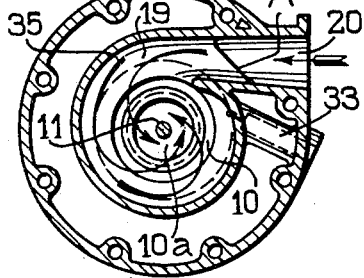
FIG. 3 illustrates a section taken along the line III—III of FIG. 2.

FIG. 3 shows how scavenging and charging air or scavenging air alone is introduced to the inner inlet valve 11. The entry connection 20 is eccentric of the cylinder axis and of the axis of the two valves and opens into a spiral chamber 19 whence the scavenging and charging air passes through the chamber 10a to the closure region of the valve 11 (see also FIGS. 1 and 2). Rotation of the air is initiated in the spiral chamber 19 as indicated by arrows 35.

Figure 4:
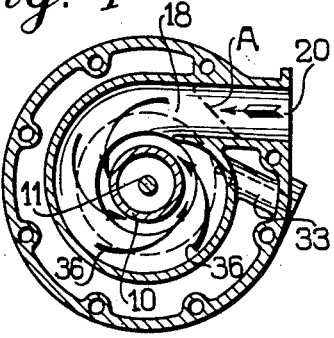
FIG. 4 is a similar view taken along the line IV—IV of FIG. 2.

Referring to FIG. 4, the entry connection 20 for the scavenging and charging air is the same as that of FIG. 3 and is also eccentric of the cylinder axis and valve axis. It leads to a spiral chamber 18 in which rotation is initiated as shown by an arrow 36, so that as the scavenging and charging air passes through the valve 10 into the cylinder chamber, the air is eddied in the same direction as indicated in FIG. 3. This results in improved cooling of the cylinder walls and satisfactory scavenging of the cylinder chamber and satisfactory fuel distribution in the combustion chamber. Advantageously, this eddying is so intense as to last at least during fuel injection and during the combustion period—i.e., in the state as shown in FIG. 2—while the two inlet valves 10 and 11 are closed—i.e., more particularly near the top dead centre position of the piston. Advantageously, the fuel is injected in the direction of rotation indicated at 35 (FIG. 3) or 36 (FIG. 4), that is, in the direction of rotation of the entering scavenging and charging air. In FIGS. 3 and 4 the separation line A of chambers 18, 19 indicates that the entry conduit 20, as is also apparent from FIG. 2, which extends to the two valves 10 and 11 is a common conduit, in contrast to the design illustrated in FIG. 1 where the entry conduits 18', 18 and 19', 19 have separate supply conduits 17' and 17" respectively.

Figure 5:
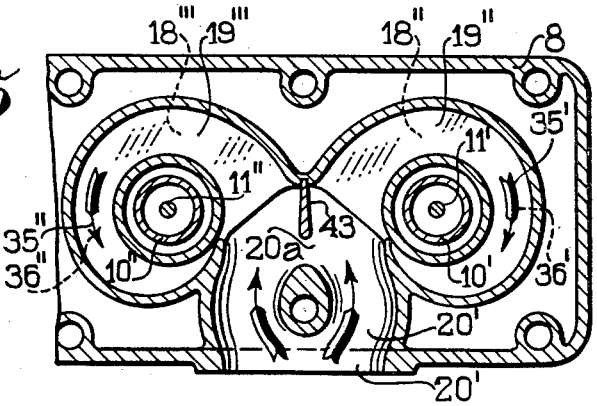
FIG. 5 is a sectional plan view of a cylinder head showing another construction.

Referring to FIG. 5, a common entry duct 20' is provided for two adjacent cylinders. From the duct 20', for instance, the scavenging and charging air can be conveyed to only the inner or outer valve of each pair of inlet valves or to all the inlet valves 10′, 11′, 10″, 11″ for these two cylinders. The duct 20′ conveys the scavenging and charging air into the two spiral chambers 18″ and 19″ around the valves and into the chambers 18‴ and 19‴ for the two sets of outer and inner inlet valves 10′, 10″ and 11′, 11″. In the chambers 18″, 19″, 18‴ and 19‴ the air is rotated as indicated by the arrows 35′, 36′, 35″, 36″ respectively. This rotation in the spiral casings 18″, 19″, 18‴, 19‴ acts as an eddying motion in the cylinder chambers 12 (FIG. 1) or in the combustion recess 9′ (FIG. 2). To improve the separation between the scavenging and charging air being supplied to the two cylinders, the entry conduit 20a can be provided with a partition, for instance, a relatively long sheet metal wall 43 cast in the cylinder head. The scavenging and charging air supply duct 20′ can extend separately to the two inlet valves of one cylinder through separate entry conduits 17′ or 17″, in accordance with FIG. 1, or, in accordance with FIGS. 2, 3 and 4, together to the inlet valves of a cylinder or to all four valves of the two adjacent cylinders.

Figure 6:
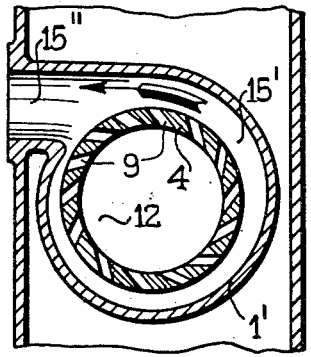
FIG. 6 is a sectional view, taken along the line VI—VI of FIG. 1.

FIG. 6 is a sectional view, taken along the line VI—VI of FIG. 1, transversely to the cylinder axis through the cylinder liner 4 and engine frame 1. In the design illustrated, a spiral receiving casing 15′ is disposed around the cylinder liner 4; the casing 15 receives the exhaust gases issuing in succession from the tangential exhaust ports 9 and guides the gases through the apertures 15″ to the exhaust gas conduit 16 (FIGS. 1 or 7). Owing to the spirally opening cross-section of the collecting conduit 15′, the rotation of the exhaust gases and scavenging air is maintained after the exit of the exhaust gases from the ports 9, so that the gases flow away from the cylinder chamber 12 (FIGS. 1 or 7) and through the ports 9 with very little resistance, thus improving scavenging and charging in the cylinder.

FIG. 7 is a similar view to FIG. 1 showing an engine which is the same as that shown in FIG. 1 except that the charging and scavenging apparatus is different. The reference 1 denotes a cylinder block, 2 a baseplate, 3 a crankshaft, 4 a cylinder liner, 5 a cam-shaft, 6 a working piston, 7 a connecting rod, 8 a cylinder head, 9 exhaust ports in the cylinder liner 4, 10 the outer and 11 the inner of the concentric inlet valves moving one inside another. 12 denotes the cylinder chamber. 21 denotes the control cam for the outer inlet valve 10 and 23 its push-rod, a follower roller 22 at the bottom of the push-rod 23 bearing against the inlet valve cam 21. 24 denotes a rocker arm, 25 a valve retainer and 26 a valve spring which closes the valve 10. The reference 27 denotes the control cam for the inner inlet valve 11 which, through the agency of a roller or sliding follower (not shown) is opened by a push-rod 28 and rocker arm 29. The valve 11 is closed by a double hairpin spring 30 and yoke 31. When the ports 9 are covered by the piston, the exhaust gases leave the cylinder and pass through the chamber 15 into the conduit 16. From the conduit 16 the exhaust gases pass into an exhaust gas turbine 37 and thence, through the exit conduit 38 thereof, either directly to atmosphere or first to a pre-heater, steam-boiler or the like (not shown) and then to atmosphere. The exhaust gas turbine 37 drives a compressor 39 which delivers compressed air into a conduit 40. From the conduit 40 the air delivered by the compressor 39 is supplied on the one hand through the conduit 18″ in to the chamber before the closure of the valve 10 and on the other hand through the conduit 41 to the scavenging and supercharging compressor or to the supercharging compressor 13′ alone, which is driven mechanically or by other means. After further compression in such supercharger the air passes through the conduit 20, 19′ into the chamber 19 and through the chamber 10a to the valve closure of the inner valve 11.

The object of the branched multiple scavenging and charging device illustrated in FIG. 7 is that the exhaust gases need drive only the compressor 39 delivering scavenging and charging air or possibly scavenging air alone, for instance through the outer inlet valve 10, to the engine, although the compressor 39 can, if required, provide the compressor 13′ which is driven mechanically or by other means, with pressurised intake air. Hence in the compressor 13′ any desired higher pressure can be produced than in the exhaust gas turbine driven compressor 39, so that engine efficiency can be further increased. The compressor 13′ can, however, derive its air from atmosphere to relieve the turbo-supercharger 37, 39 still further of load. The air supplied by the compressor 13′ can serve wholly or partly as auxiliary supercharging air. This is air which, when the exhaust ports 9 are closed, is introduced into the cylinder through the two inlet valves 10 and 11 or through only one of them. The supply conduits 19, 19′ and 20 can be in a position eccentric of the cylinder axis as illustrated in FIGS. 3, 4 and 5. Hence the associated scavenging, charging or auxiliary charging air can, before entry, be rotated around and through the valves as far as the cylinder, that is, the combustion chamber. The rate of eddying can be varied by the design of the conduits and by the pressure or speed of the charging, scavenging or auxiliary charging air passing through the conduits. For instance, more particularly in a construction such as illustrated in FIG. 7 where the blower 13′ can be used to produce a higher pressure than is possible with the exhaust gas turbo-compressor 37, 39, a higher rate of eddying can be initiated in the supply conduit 19, 10a to the inner valve 11 than around and through the outer inlet valve 10. Of course, air eddying can be produced not only by a spiral casing but by other means such as the provision of vanes or the like, for instance, in the chambers 18, 19, 10a or by known screens on the valves. The rate of eddying associated with one inlet valve can be greater than the rate of eddying associated with the other inlet valve. The compressor 13′ can supply its charging air through the outer inlet valve, and the exhaust gas turbo-supercharger can supply its delivery mainly as scavenging air through the inner inlet valve 11. For instance, the auxiliary charging air is introduced through the inner valve 11 and a relatively high rate of eddying produced therein. The chambers 19′, 19 and 18′, 18 can be so designed and arranged that the eddying produced by the two inlet valves 10 and 11 is oppositely directed.

In FIG. 7 the reference 32 denotes a fuel injector which is mounted in a connection 33 in the cylinder head 8 and which receives fuel from a fuel pump 34. The compressor 13′ can be a centrifugal compressor or any kind of rotary blower. The actuating cams 22 and 27 shown in FIG. 7 are so designed that the two valves 10 and 11 open substantially simultaneously but that the cam 27 closes the valve 11 later than the valve 10. The purpose of this is for auxiliary charging of the cylinder and also to ensure that eddying goes on for as long as possible before the compression stroke and during the combustion phase.

In a design such as is shown in FIG. 7, at least one cooling device 42, 43 can, if required, be provided after the turbo-supercharger 37, 39 or supercharging compressor 13′. This step provides the advantages already mentioned with reference to FIG. 1.

The design of the actuating cams 22 and 27 can also be such that neither of the two inlet valves opens simultaneously with the other nor closes simultaneously with the other.

In FIG. 8 the control cams 21 and 27 are so designed that the inlet valve 10 is opened before the inlet valve 11 and the inlet valve 11 is closed after the inlet valve 10. With this design scavenging starts through the outer valve 10 and the outer periphery of the cylinder is scavenged first, the scavenging air cooling the cylinder surface 4 and the piston periphery. Scavenging by way of the inner valve 11 starts later so that the interior of the cylinder 12 is further scavenged. When the valves close, the outer valve closes first and the inner valve subsequently, so that charging air or auxiliary charging air continues to flow into the cylinder through the inner valve. If the inlet valve 11 produces rotation of the entering scavenging and charging air or of the charging air alone, the rotation in the cylinder lasts longer.

As shown in FIG. 9, the control cams 21 and 27 can be so designed that the inner valve 11 opens first and the outer valve 10 subsequently, whereafter the inner valve closes first and the outer valve subsequently. The reason for this design is that scavenging starts through the inner valve and auxiliary charging would be terminated through the outer valve. With this arrangement the piston crown would be cooled first and the cylinder interior scavenged.

The valve-actuating cams could also be so designed that in one case the outer valve opens first and the same valve closes first or vice-versa the inner valve first opens and recloses later. With these designs and the actuating cam designs shown in FIGS. 8 and 9, therefore, the two inlet valves of one cylinder never open or close simultaneously, so that there is never an aggregation of the actuating forces associated with the openings and closings of these valves.

What I claim is:

1. A supercharged two-stroke internal combustion engine comprising a cylinder, piston means reciprocable in said cylinder, a cylinder head, said cylinder having outlet ports located adjacent the bottom dead center position of said piston means, air inlet duct means for said cylinder in said cylinder head, said cylinder head having a circular opening with the circumference thereof defining a valve seat, a tubular outer valve component, an inner valve component mounted concentrically of said outer valve component with said outer and inner valve components constituting an inlet valve, said tubular outer valve component having a perimetric portion adapted to rest on said seat and further having a seat thereon for said inner valve component, said outlet ports providing means for a tangential outflow of the scavenging air and exhaust gas thereby rotating the gases in said cylinder, and said air inlet duct means comprising a space upstream of said inlet valve component for producing a rotation of air in said space in the same direction as imparted to the gases in said cylinder by said outlet ports, said air inlet duct means comprises a space upstream of both said valve components and both of said spaces are spirally formed to form chambers having different flow cross-sections, whereby said respective air streams rotate at different velocities in said cylinder.

2. An engine according to claim 1 wherein said spirally formed chambers are of opposite hand and decrease in cross-section in the direction of air flow.

3. An engine according to claim 1 wherein said air inlet duct means comprises a space upstream of both said valve components and separate air inlet conduits enter said chambers from opposed directions, one of the air inlet conduits being for the charging air and the other for the scavenging air.

4. An engine according to claim 1 wherein two cylinders are arranged side-by-side, a common inlet to the air inlet duct means of both cylinders being provided, said air inlet duct means including symmetrical, spirally formed spaces of opposite hand leading to corresponding valve seats of said valve components of said two cylinders, whereby opposite rotations of gases are produced in said spaces and in said two cylinders.

5. An engine according to claim 1, wherein a spirally formed collecting chamber is provided around the outlet ports for rotating the gases issuing therethrough in the same direction as is induced by the outlet ports.

6. A supercharged two-stroke internal combustion engine comprising a cylinder, piston means reciprocable in said cylinder, a cylinder head, said cylinder having outlet ports located adjacent the bottom dead center position of said piston means, air inlet duct means for said cylinder in said cylinder head, said cylinder head having a circular opening with the circumference thereof defining a valve seat, a tubular outer valve component, an inner valve component mounted concentrically of said outer valve component with said outer and inner valve component constituting an inlet valve, said tubular outer valve component having a perimetric portion adapted to rest on said seat and further having a seat thereon for said inner valve component, said outlet ports providing means for a tangential outflow of the scavenging air and exhaust gas thereby rotating the gases in said cylinder, and said air inlet duct means comprising a space upstream of said inlet valve component for producing a rotation of air in said space in the same direction as imparted to the gases in said cylinder by said outlet ports, said air inlet duct means comprising a space upstream of each of said valve components which are superposed in said cylinder head and surround said outer and inner valve components, a communication path between said inner valve component and the uppermost of said spaces, a communication path between said outer valve component and the lowermost of said spaces, and at least one air inlet extending tangentially relative to and communicating with said spaces to impart rotational movement to the air in said spaces in the same direction as is imparted to the gases in said cylinder by said outlet ports.

References Cited in the file of this patent

UNITED STATES PATENTS

| | | |
|---|---|---|
| 475,385 | Connelly | May 24, 1892 |
| 1,168,199 | Hardy | Jan. 11, 1916 |
| 1,329,811 | Smith | Feb. 3, 1920 |
| 1,496,278 | Schneider | June 3, 1924 |
| 1,684,407 | Nibbs | Sept. 18, 1928 |
| 1,899,217 | Taylor et al. | Feb. 28, 1933 |
| 2,067,288 | Riehm | Jan. 12, 1937 |
| 2,189,106 | Garve et al. | Feb. 6, 1940 |
| 2,213,202 | Buchi | Sept. 3, 1940 |
| 2,252,186 | Kylen | Aug. 12, 1941 |
| 2,624,171 | Kollsman | Jan. 6, 1953 |

FOREIGN PATENTS

| | | |
|---|---|---|
| 489,765 | France | Oct. 29, 1918 |
| 247,778 | Great Britain | Feb. 25, 1926 |

OTHER REFERENCES

Diesel Engine Principles and Practice—Philosophical Library Inc., 1955, pages 4–13.